US012427769B2

(12) United States Patent
Manabe et al.

(10) Patent No.: US 12,427,769 B2
(45) Date of Patent: Sep. 30, 2025

(54) RECORDING ELEMENT SUBSTRATE AND METHOD OF MANUFACTURING THE SAME

(71) Applicant: CANON KABUSHIKI KAISHA, Tokyo (JP)

(72) Inventors: Takanobu Manabe, Kanagawa (JP); Junichiro Iri, Kanagawa (JP); Hiroyuki Murayama, Oita (JP); Kenji Fujii, Kanagawa (JP); Satoshi Ibe, Kanagawa (JP); Narumi Shinohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 18/067,990

(22) Filed: Dec. 19, 2022

(65) Prior Publication Data

US 2023/0234353 A1 Jul. 27, 2023

(30) Foreign Application Priority Data

Jan. 26, 2022 (JP) ................................ 2022-009843

(51) Int. Cl.
*B41J 2/14* (2006.01)
*B41J 2/06* (2006.01)

(52) U.S. Cl.
CPC . *B41J 2/14* (2013.01); *B41J 2/06* (2013.01); *B41J 2002/14362* (2013.01); *B41J 2202/22* (2013.01)

(58) Field of Classification Search
CPC ....... B41J 2/14; B41J 2/16; B41J 2/175; B41J 2/135; B41J 2/1628; B41J 2/1631;
(Continued)

(56) References Cited

U.S. PATENT DOCUMENTS 4,808,260 A * 2/1989 Sickafus ................ B41J 2/1635 216/2
5,608,436 A * 3/1997 Baughman ............. B41J 2/1634 347/65

(Continued)

FOREIGN PATENT DOCUMENTS

EP 841167 A2 * 5/1998 ............ B41J 2/1603
JP 2002326363 A 11/2002

OTHER PUBLICATIONS

Machine Translation of JP-2002326363-A; Retrieved Sep. 25, 2024. (Year: 2002).*

*Primary Examiner* — John Zimmermann
(74) *Attorney, Agent, or Firm* — Canon U.S.A., Inc. IP Division

(57) ABSTRACT

A recording element substrate includes an ejection port forming member in which an ejection port configured to eject liquid is formed, and a substrate. The substrate includes a liquid supply port that supplies the liquid to the ejection port, a first surface on which the ejection port forming member is placed, and a second surface that is a rear surface of the first surface. The liquid supply port includes a first portion perpendicularly connected to the first surface, and a second portion connected to the first portion. An inner wall of the second portion includes an inclined surface that is inclined toward an inner wall of the first portion such that a width of the second portion is gradually increased toward the second surface. A hydrophilic film is formed at least on the inner wall of the first portion.

25 Claims, 11 Drawing Sheets

(58) Field of Classification Search
CPC .... B41J 2/14145; B41J 2/1632; B41J 2/1404; B32B 27/06; H01L 21/306; B81B 2201/052
See application file for complete search history.

(56) References Cited

U.S. PATENT DOCUMENTS

| | | | | |
|---|---|---|---|---|
| 6,143,190 | A * | 11/2000 | Yagi | B41J 2/1642 216/2 |
| 6,805,432 | B1 * | 10/2004 | Milligan | B41J 2/1629 347/65 |
| 7,901,064 | B2 * | 3/2011 | Urayama | B41J 2/1645 347/65 |
| 8,613,862 | B2 * | 12/2013 | Asai | B41J 2/1631 438/401 |
| 9,707,586 | B2 * | 7/2017 | Rivas | B41J 2/1603 |
| 2002/0118253 | A1 * | 8/2002 | Ohno | B41J 2/1629 347/47 |
| 2003/0197762 | A1 * | 10/2003 | Park | B41J 2/1645 347/65 |
| 2005/0117005 | A1 * | 6/2005 | Fujii | B41J 2/1603 347/92 |
| 2007/0212890 | A1 * | 9/2007 | Sakai | B41J 2/1634 257/E21.597 |
| 2007/0212891 | A1 * | 9/2007 | Yamamuro | B41J 2/1634 438/733 |
| 2011/0000658 | A1 * | 1/2011 | Tanaka | C09D 5/1675 428/447 |
| 2011/0020966 | A1 * | 1/2011 | Chida | B41J 2/1645 438/21 |
| 2013/0027470 | A1 * | 1/2013 | Kato | B41J 2/14233 347/45 |
| 2014/0061152 | A1 * | 3/2014 | Yamamuro | B41J 2/1645 216/27 |
| 2015/0151543 | A1 * | 6/2015 | Yaginuma | B41J 2/1404 347/44 |

* cited by examiner

RECORDING ELEMENT SUBSTRATE AND METHOD OF MANUFACTURING THE SAME

BACKGROUND

Field

The present disclosure relates to a recording element substrate and a method of manufacturing the recording element substrate.

Description of the Related Art

A liquid ejection apparatus such as an inkjet printer ejects liquid to record an image, characters, and the like on a recording medium such as paper. The liquid ejection apparatus includes a liquid ejection head as a part for ejecting liquid. The liquid ejection head includes a recording element substrate. The recording element substrate is provided with an ejection port forming member including ejection ports ejecting liquid, and a substrate on which the ejection port forming member is placed. Further, the substrate is provided with energy generation elements that generate energy to eject liquid from the ejection ports, and a liquid supply port that supplies liquid to the ejection ports.

Japanese Patent Application Laid-Open No. 2002-326363 discusses a method of manufacturing such a liquid ejection head including the recording element substrate. In the method discussed in Japanese Patent Application Laid-Open No. 2002-326363, after the liquid supply port is formed in the substrate, the liquid supply port is filled with a filler, and then the ejection port forming member is formed. FIG. 10 is a schematic view illustrating a state where the liquid supply port is filled with the filler according to a conventional example in Japanese Patent Application Laid-Open No. 2002-326363. As illustrated in FIG. 10, after a tape 25 is stuck to a surface of a substrate 10 provided with energy generation elements 2, a liquid supply port 13 is filled with a filler 15 by using a dispensing needle 26.

In the method discussed in Japanese Patent Application Laid-Open No. 2002-326363, however, bubbles may be trapped in with the filler in some cases.

FIGS. 11A and 11B are schematic views illustrating that state. After the filler 15 is applied to the liquid supply port 13 as illustrated in FIG. 10, the filler 15 flows downward. At this time, the filler 15 easily flows downward over an entire width of the liquid supply port 13 (FIG. 11A) because the liquid supply port 13 is formed perpendicularly with respect to the substrate 10. Thus, air inside the liquid supply port 13 cannot escape to the outside (upper direction in FIGS. 11A and 11B), and bubbles 3 are trapped inside the liquid supply port 13 with the filler when the filler 15 reaches the tape 25.

If such bubbles are expanded by, for example, heat, the bubbles influences the flatness of the tape 25, and eventually influences the flatness of the ejection port forming member. As a result, there is concern that the bubble influences the accuracy of the ejection ports and also influences printing quality when liquid droplets are ejected from the ejection ports.

SUMMARY

The present disclosure is directed to a recording element substrate that can prevent bubbles being trapped inside a liquid supply port formed perpendicularly with respect to a substrate when the liquid supply port is filled with a filler, and to a method of manufacturing the recording element substrate.

According to an aspect of the present disclosure, a recording element substrate includes an ejection port forming member in which an ejection port configured to eject liquid is formed, and a substrate including a liquid supply port configured to supply the liquid to the ejection port, a first surface on which the ejection port forming member is placed, and a second surface that is a rear surface of the first surface, wherein the liquid supply port includes a first portion perpendicularly connected to the first surface, and a second portion connected to the first portion, wherein an inner wall of the second portion includes an inclined surface that is inclined toward an inner wall of the first portion such that a width of the second portion is gradually increased toward the second surface, and wherein a hydrophilic film is formed at least on the inner wall of the first portion.

Further features of the present disclosure will become apparent from the following description of exemplary embodiments with reference to the attached drawings.

DESCRIPTION OF THE EMBODIMENTS

Figure 1A:
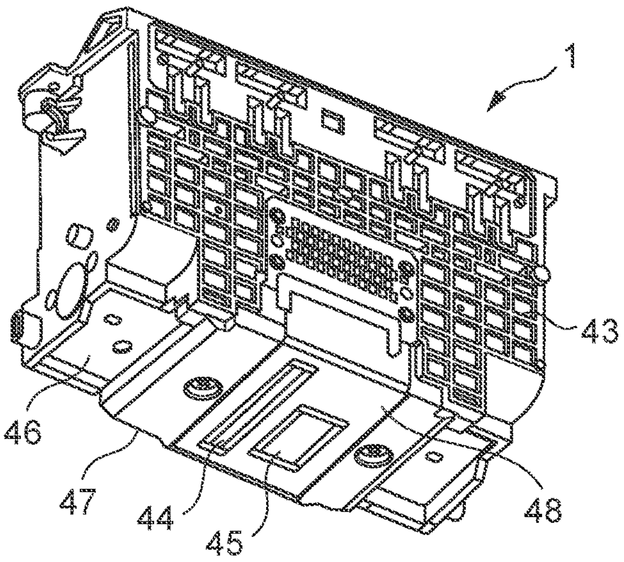
FIG. 1A is a perspective view illustrating a liquid ejection head.

Some exemplary embodiments of the present disclosure are described with reference to drawings. In the following description, components having the same functions are denoted by the same reference numerals in the drawings, and descriptions thereof are omitted here in some cases.

Liquid Ejection Head

Figure 1B:
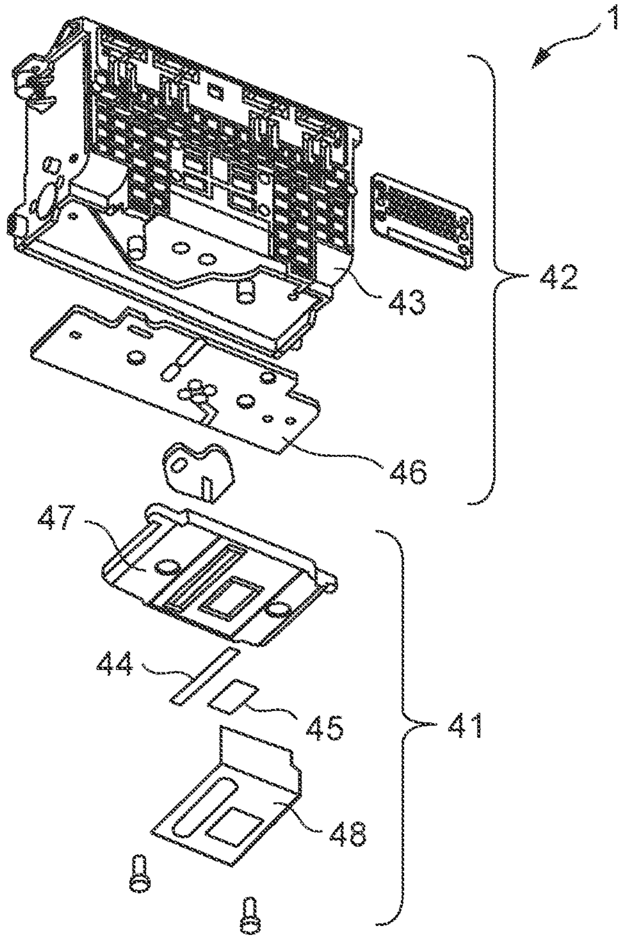
FIG. 1B is an exploded view of the liquid ejection head.

FIG. 1A is a perspective view illustrating a liquid ejection head 1 according to a first exemplary embodiment, and FIG. 1B is an exploded perspective view illustrating members of the liquid ejection head 1 illustrated in FIG. 1A in an exploded manner. As illustrated in FIG. 1B, the liquid ejection head 1 according to the present exemplary embodiment mainly includes a recording element unit 41 and a housing unit 42.

The recording element unit 41 mainly includes recording element substrates 44 and 45 including ejection ports 11 (FIGS. 2A and 2B) for ejecting liquid, an electric wiring substrate 48 supplying power to the recording element substrates 44 and 45, and a supporting plate 47 supporting the recording element substrates 44 and 45.

The housing unit 42 mainly includes a housing 43 to which a liquid container (not illustrated) storing liquid to be supplied to the ejection ports 11 (FIGS. 2A and 2B) is connected, and a flow path forming member 46 in which a flow path for supplying the liquid from the liquid container (not illustrated) to the ejection ports 11 is formed.

Recording Element Substrate

Figure 2A:
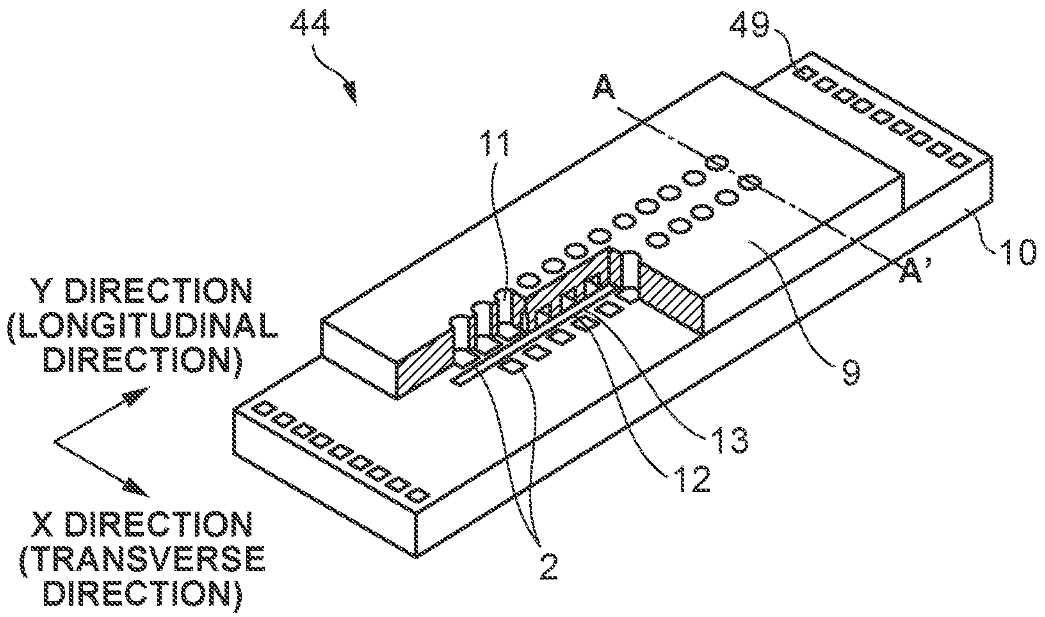
FIG. 2A is a schematic view of a recording element substrate.

The recording element substrate 44 is described with reference to FIGS. 2A and 2B. FIG. 2A is a schematic view of the recording element substrate 44. As illustrated in FIG. 2A, the recording element substrate 44 includes a substrate 10 made of silicon or the like, and an ejection port forming member 9. Energy generation elements 2 that generate energy to eject the liquid from the ejection ports 11 are formed in the substrate 10.

The energy generation elements 2 are electrically connected to terminals 49 provided on the substrate 10 via electric wires (not illustrated) made of aluminum or the like. A plating layer made of, for example, gold (Au layer) is provided on a surface of each of the terminals 49.

The recording element substrate 44 is electrically connected to the electric wiring substrate 48 via the terminals 49. The energy generation elements 2 generate ejection energy to eject the liquid such as ink, by receiving an electric signal from the electric wiring substrate 48.

The ejection port forming member 9 forms the ejection ports 11 to eject the liquid, and pressure chambers 12 communicating with the ejection ports 11. The substrate 10 includes a liquid supply port 13, and the liquid is supplied from the liquid supply port 13 to the pressure chambers 12. The liquid supply port 13 is a through hole penetrating through the substrate 10. Further, the substrate 10 has a rectangular shape extending along a direction where the energy generation elements 2 are arranged. A transverse direction of the substrate 10 is referred to as an X direction, and a longitudinal direction orthogonal to the X direction is referred to as a Y direction.

Figure 2B:
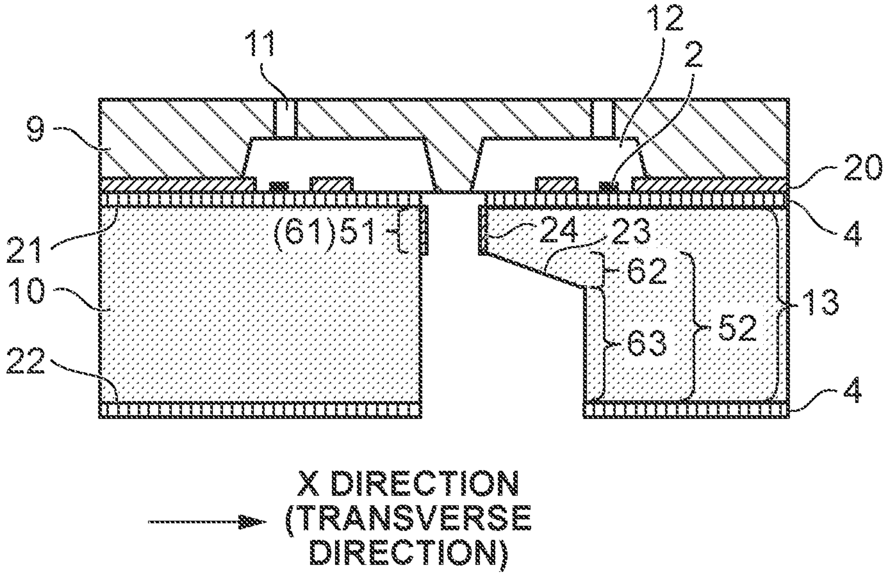
FIG. 2B is a cross-sectional view of the recording element substrate.

FIG. 2B is a cross-sectional view of the recording element substrate 44 taken along line A-A' in FIG. 2A. In the following description, the cross-sectional view of the recording element substrate 44 indicates the cross-sectional view taken along the line A-A' in FIG. 2A. Furthermore, in the following description, of two surfaces of the substrate 10, a front surface of the substrate 10 on which the ejection port forming member 9 is mounted is referred to as a first surface 21, and a rear surface of the substrate 10 on the opposite side of the first surface 21 is referred to as a second surface 22. For example, an oxide film 4 made of $SiO_2$ and an adhesion improving layer 20 are provided over an entire surface or a part of each of the first surface 21 and the second surface 22.

Further, various inorganic films other than the oxide film 4 may be provided as necessary. The oxide film 4 is to protect the substrate 10 from liquid, and the adhesion improving layer 20 is to enhance adhesiveness between the substrate 10 and the ejection port forming member 9.

The liquid supply port 13 includes first liquid flow paths 51 perpendicularly connected to the first surface 21, and a second liquid flow path 52 connected to the second surface 22. In this specification, the expression of being perpendicularly connected to a component not only means a case of being connected to the component at an angle of 90 degrees, but also may consider variation caused by manufacturing errors of the first liquid flow paths 51. In other words, it is sufficient if the first liquid flow paths 51 are each substantially perpendicularly connected to the first surface 21, i.e., the first liquid flow paths 51 are each connected to the first surface 21 at an angle of 90±5 degrees.

The first liquid flow paths 51 and the second liquid flow path 52 are connected to each other. The liquid is supplied from the second liquid flow path 52 to the first liquid flow paths 51, and the liquid is further supplied from the first liquid flow paths 51 to the ejection ports 11. The first liquid flow paths 51 perpendicularly connected to the first surface 21 are also referred to as first portions 61. Further, in the second liquid flow path 52, a region including a portion where an inner wall is inclined is referred to as a second portion 62, and a portion where one end is connected to an inclined surface of the inner wall of the second portion 62 and the other end is perpendicularly connected to the second surface 22 is referred to as a third portion. In other words, in FIG. 2B, it can be said that the liquid supply port 13 is formed by the first portions 61, the second portion 62, and the third portion 63. In FIG. 2B, the liquid supply port 13 including the third portion 63 is illustrated; however, the liquid supply port 13 according to the present exemplary embodiment may not include the third portion 63. In other words, the liquid supply port 13 may be formed only by the first portions 61 and the second portion 62.

The inner wall of the second portion 62 includes an inclined surface 23 inclined toward the inner walls of the first portions 61 such that a width of the second portion 62 in the transverse direction (X direction) is gradually increased toward the second surface 22. In other words, the second liquid flow path 52 is connected to the first portions 61 via the inclined surface 23.

In the first exemplary embodiment, hydrophilic films 24 are provided on the inner walls of the first portions 61. The reason for forming the hydrophilic films 24 and a method of forming the hydrophilic films 24 are described in detail below.

Method of Manufacturing Recording Element Substrate

Figure 3:
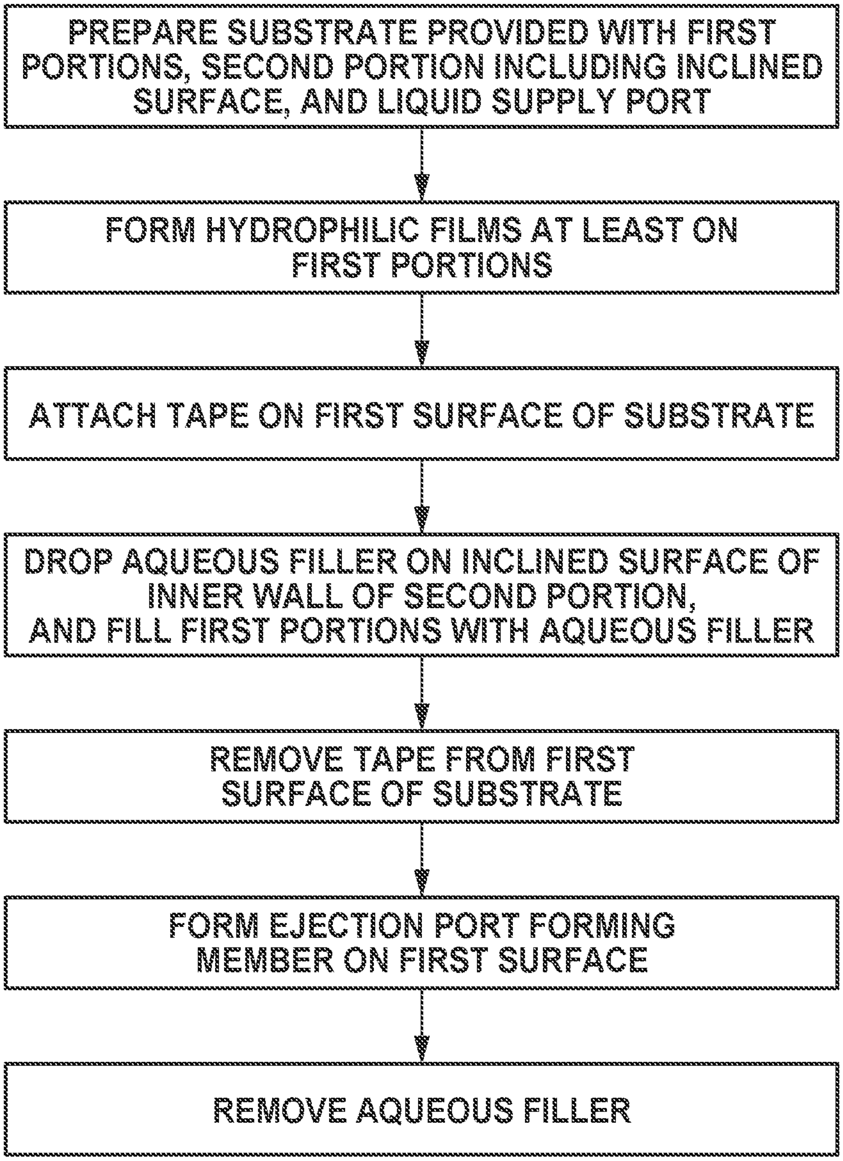
FIG. 3 is a flowchart illustrating steps of a method of manufacturing the recording element substrate according to an exemplary embodiment of the present disclosure.

FIG. 3 is a flowchart illustrating steps of a method of manufacturing the recording element substrate according to the present exemplary embodiment. FIGS. 4A to 4F are cross-sectional views illustrating a step of forming the recording element substrate 44 according to the present exemplary embodiment, i.e., details of a formation process of the first liquid flow paths 51 and the second liquid flow path 52.

Figure 4A:
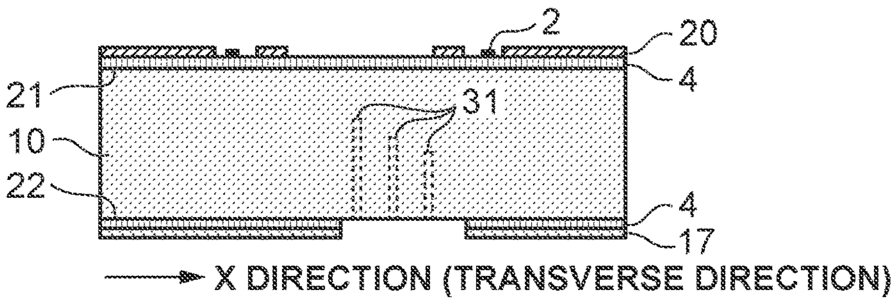
FIG. 4A is a schematic view illustrating a step of performing laser processing in formation of a second liquid flow path.

FIG. 4A illustrates a step of performing laser processing from the second surface 22 side of the substrate 10 to form the second liquid flow path 52. First, on the second surface 22, a region other than a region where the second liquid flow path 52 is to be formed is protected by a substrate rear-surface protection film (simply, "rear-surface protection film") 17. The substrate rear-surface protection film 17 can be formed by, for example, a process similar to a method of forming the above-described adhesion improving layer 20. Thereafter, the oxide film 4 in the region not protected by the substrate rear-surface protection film 17 is removed to form an opening region. Examples of the method of removing the oxide film 4 include wet treatment with buffered hydrofluoric acid. An opening dimension of the second liquid flow path 52 in the transverse direction (X direction) is desirably about 200 μm to 1500 μm. An opening dimension in the longitudinal direction is desirably, for example, about 5000 μm to 40000 μm, but is to be appropriately set based on the number of ejection ports 11 provided in the first surface 21.

Thereafter, a plurality of blind holes (hereinafter, guide holes 31) each having a predetermined depth from the second surface 22 side is formed in the region to be opened, by using a laser. As described above, the inner wall of the second portion 62 needs to have the inclined surface 23 inclined toward the inner walls of the first portions 61 such that the width of the second portion 62 in the transverse direction is gradually increased toward the second surface 22. Therefore, as illustrated in FIG. 4A, the guide holes 31 are formed while changing the depths of the guide holes 31 depending on the shape of the inclined surface 23 to be formed. In other words, the patterns and the depths of the guide holes 31 are appropriately adjustable based on the shape of the inclined surface 23 to be formed and the opening dimension.

Figure 4B:
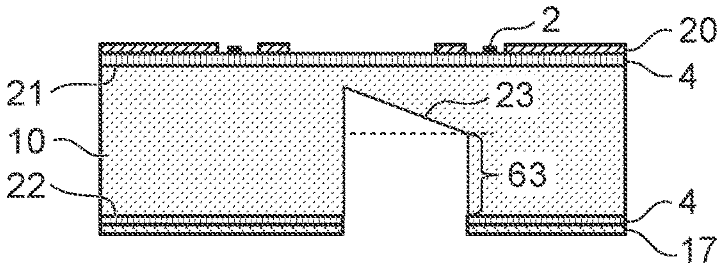
FIG. 4B is a schematic view illustrating an anisotropic etching step in the formation of the second liquid flow path.

FIG. 4B illustrates a step of forming the second liquid flow path 52 by anisotropic etching. Examples of an etchant used for the anisotropic etching include a strong alkaline solution such as Tetramethylammonium hydroxide (TMAH) and potassium hydroxide (KOH). The etchant permeates the guide holes 31, the etching progresses along the guide holes 31, and the guide holes 31 are connected to one another. As a result, the second liquid flow path 52 is formed. If an etching time is excessively long, the inclination of the inclined surface 23 is ruined as the etching progresses. Thus, it is necessary to appropriately adjust the etching time in consideration of the patterns and the depths of the guide holes 31, the desired shape of the inclined surface 23, and the opening dimension.

Figure 4C:
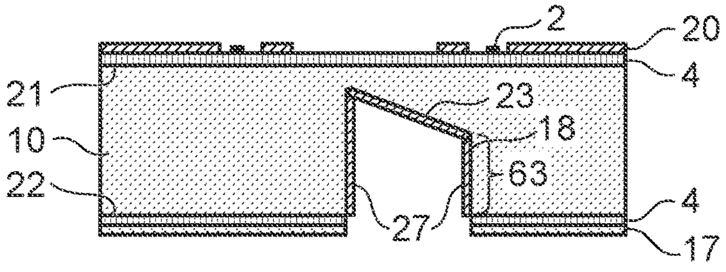
FIG. 4C is a schematic view illustrating a step of applying a protection film to a wall surface of the second liquid flow path.

FIG. 4C illustrates a step of applying a liquid-flow-path wall-surface protection film 18 to the wall surface of the second liquid flow path 52. The wall surface of the second liquid flow path 52 indicates a side wall portion 27 and the inclined surface 23 of the second liquid flow path 52. The liquid-flow-path wall-surface protection film 18 functions as a mask to prevent the hydrophilic film from being formed on the wall surface of the second liquid flow path 52 in a subsequent step of forming the hydrophilic films 24 on the inner surfaces of the first portions 61. As a result, the hydrophilic films 24 are formed only on the inner walls of the first portions 61. At this time, the entire wall surface of the second liquid flow path 52 needs not be protected; however, the inclined surface 23 is desirably protected because the hydrophilic films 24 are desirably formed only on the inner walls of the first portions 61 for a reason described in detail below.

As the liquid-flow-path wall-surface protection film 18, a positive photosensitive resin is usable. As an application method, various kinds of application methods such as spin coating and curtain coating are usable. The liquid-flow-path wall-surface protection film 18 desirably has a film thickness of, for example, about 2 μm to 10 μm, but may have another thickness durable as the mask in formation of the hydrophilic films 24.

Figure 4D:
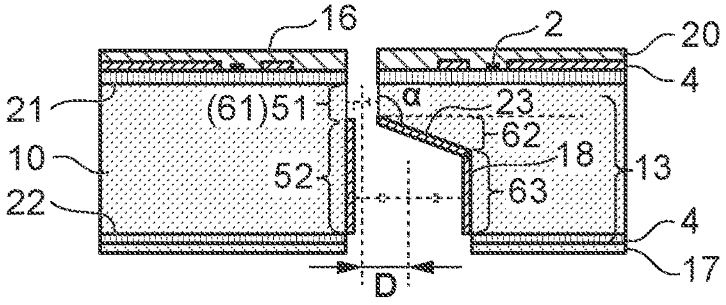
FIG. 4D is a schematic view illustrating a step of forming first liquid flow paths.

FIG. 4D illustrates a step of forming the first liquid flow paths 51. First, on the first surface 21, a front-surface protection film 16 is formed in a region other than regions where the first liquid flow paths 51 are to be opened, by a method similar to the method in FIG. 4A. At this time, an opening shape of each of the first liquid flow paths 51 is desirably a quadrangular shape, but may be a circular shape, an elliptical shape, or the like. In the case of the quadrangular shape, corners may be chamfered. An opening dimension of each of the first liquid flow paths 51 is desirably about 30 μm to 200 μm, and an opening area is desirably about 900 $\mu m^2$ to 40000 $\mu m^2$.

Next, the first liquid flow paths 51 are formed by dry etching from the first surface 21 side.

As the method of forming the first liquid flow paths 51, laser processing is usable, besides the dry etching. A depth of each of the first liquid flow paths 51 is already determined by the thickness of the substrate 10 and the shape of the second liquid flow path 52 already formed, but is desirably about 30 μm to 300 μm.

Figure 4E:
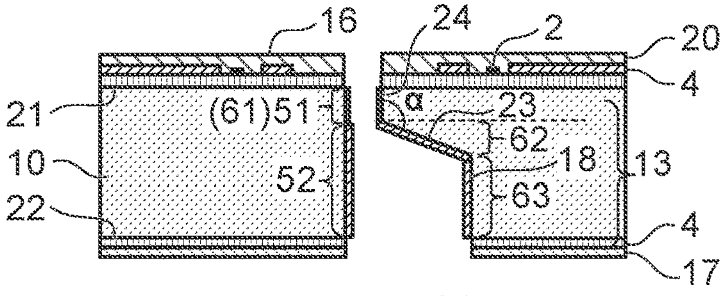
FIG. 4E is a schematic view illustrating a step of forming hydrophilic films on inner walls of first portions.

FIG. 4E illustrates a step of forming the hydrophilic films 24 at least on the inner walls of the first portions 61. As a method of forming the hydrophilic films 24, for example, a method of ashing the first liquid flow paths 51 from the first surface 21 side by using oxygen plasma is usable. As a result of the processing, the hydrophilic films 24 are formed on the inner walls of the first portions 61. The hydrophilic film is not formed on a part of the wall surface of the second liquid flow path 52 because the part of the wall surface of the second liquid flow path 52 is protected with the liquid-flow-path wall-surface protection film 18. For a reason described below, the hydrophilic film 24 is formed only on the inner wall of each of the first portions 61 in FIG. 4E.

Figure 4F:
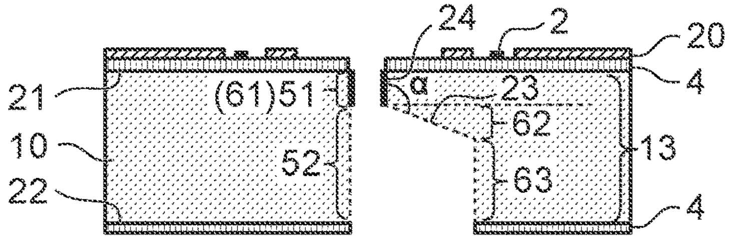
FIG. 4F is a schematic view illustrating a step of removing the protection film.

FIG. 4F illustrates a step of removing the front-surface protection film 16, the rear-surface protection film 17, and the liquid-flow-path wall-surface protection film 18. These films can be removed by using peeling liquid that can remove the used positive photosensitive resin.

Next, details of the process of filling the first portions 61 and the second liquid flow path 52 formed by the above-described method with the filler 15 are described with reference to FIGS. 5A to 5G. In the first exemplary embodiment, as the filler 15, for example, a aqueous filler obtained by dissolving polyvinyl alcohol (PVA) into pure water is usable. In addition, a resin dissolved into an aqueous solvent is usable as long as it can remove the filler 15. It is sufficient if the filler 15 is applied flatly to each of the first portions 61 on the first surface 21 side, and each of the first portions 61 needs not be filled entirely with the filler 15. Further, the second liquid flow path 52 is also not necessarily filled entirely with the filler 15.

Figure 5D:
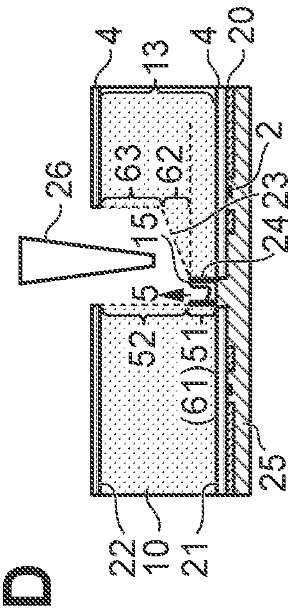
FIG. 5D is a schematic view illustrating a state where the first liquid flow paths are filled with the filler.
Figure 5E:
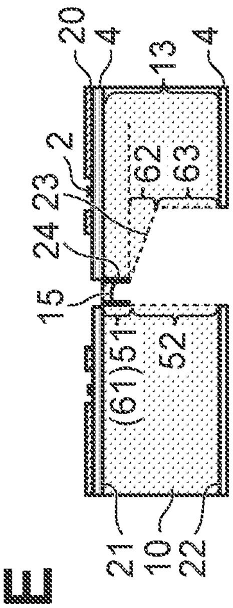
FIG. 5E is a schematic view illustrating a step of removing the tape.
Figure 5F:
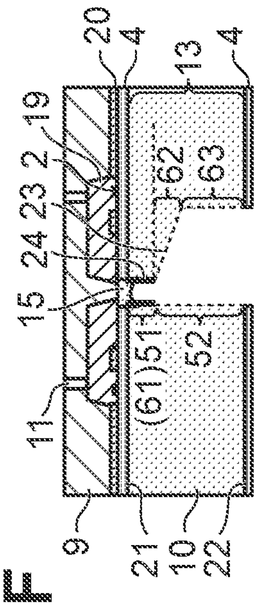
FIG. 5F is a schematic view illustrating a step of forming mold materials to form pressure chambers and an ejection port forming member.
Figure 5G:
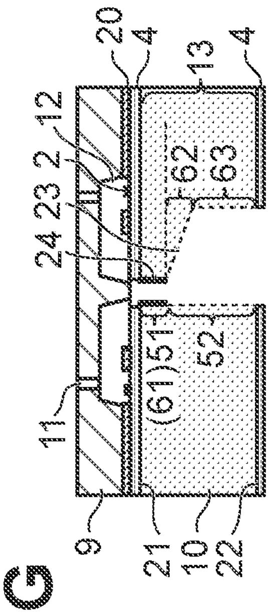
FIG. 5G is a schematic view illustrating a step of removing the filler and the mold materials.
Figure 5A:
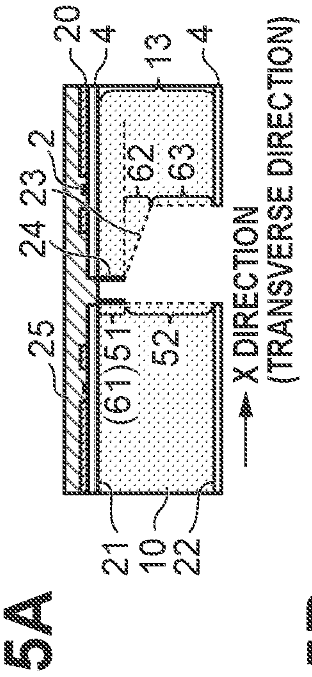
FIG. 5A is a schematic view illustrating a step of attaching a tape.

FIG. 5A illustrates a step of attaching the tape 25 to the first surface 21 of the substrate 10 including the liquid supply port 13 so as to prevent the filler 15 from leaking when the first portions 61 and the second liquid flow path 52 are filled with the filler 15. The tape 25 is desirably made of a material that can absorb unevenness of the first surface 21 to prevent the filler 15 from leaking. Further, in a case where heating treatment is performed after the filler 15 is applied, the tape 25 is desirably made of a material durable against the heating temperature. Further, since the filler 15 comes into contact with the tape 25, the tape 25 desirably has resistance to the solvent of the filler 15.

Figure 5B:
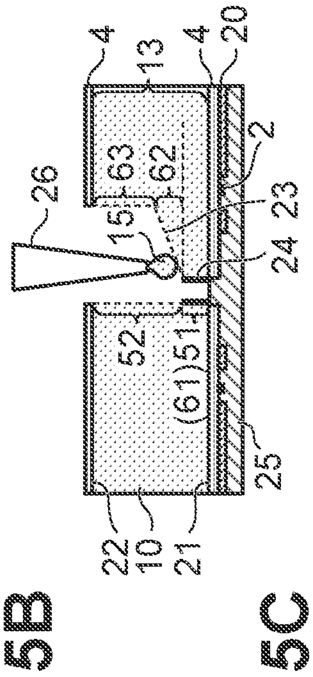
FIG. 5B is a schematic view illustrating a step of filling the first portions with a filler.

FIG. 5B illustrates a step of dropping the aqueous filler 15 onto the inclined surface 23 of the inner wall of the second portion 62, and filling each of the first portions 61 with the aqueous filler 15. As a method of applying the filler 15, for example, a filling method using a dispensing apparatus including a dispensing needle 26 that has a size insertable into the second liquid flow path 52 is usable.

Further, as the idea of the present disclosure, the filler 15 is dropped onto the inclined surface 23 of the inner wall of the second portion 62, is caused to move and flow along the inclined surface 23, thereby filling each of the first portions 61 with the filler 15. Thus, at the time of filling, it is desirable to drop the filler 15 from just above the inclined surface 23 so that the filler 15 moves along the inclined surface 23.

Figure 5C:
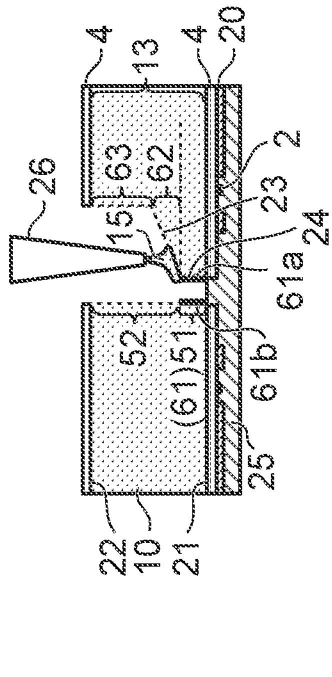
FIG. 5C is a schematic view illustrating a state where the first liquid flow paths are filled with the filler.

FIG. 5C and FIG. 5D each illustrate a state where each of the first liquid flow paths 51 is being filled with the filler 15. First, as illustrated in FIG. 5C, the filler 15 dropped from just above the inclined surface 23 flows along the inclined surface 23 and flows into each of the first liquid flow paths 51. In other words, the inclination structure allows the filler 15 to flow into each of the first portions 61 from one side (inclined surface 23) of the liquid supply port 13, unlike the conventional example in which the filler 15 flows downward (toward each of the first portions 61) over the entire width of the liquid supply port 13. As a result, in each of the first portions 61, the filler 15 is filled from an inner wall 61*a* connected to the inclined surface 23, toward an inner wall 61*b*. Accordingly, the air inside the first portions 61 can escape to the outside from the inner wall 61*b* side with the flow of the filler 15 as indicated by an air flow (arrow) 5 illustrated in FIG. 5D.

Further, since the hydrophilic films 24 are provided on the wall surfaces of the first portions 61, the aqueous filler 15 easily flows along the inner walls of first portions 61 more preferentially. This makes it possible to prevent bubbles from entering a space between the inner wall of each of the first portions 61 and the filler 15, and to further prevent inclusion of bubbles with the filler 15. Since the filler 15 can be applied without trapping bubbles, it is possible to form the ejection port forming member 9 in the subsequent step without deteriorating flatness.

In a case where the hydrophilic treatment is performed only on the wall surfaces of the first portions 61, the filler 15 flows into the first portions 61 without remaining on the inclined surface 23 as compared with a case where the hydrophilic treatment is also performed on the inclined surface 23 of the inner wall of the second portion 62. In other words, a filling rate of the filler 15 is improved, and the filling is performable with a smaller amount of filler, which leads to cost reduction.

FIG. 5E illustrates a step of performing heating treatment after the filling with the filler 15 is performed, and removing the tape 25. A hot plate or an oven is usable for the heating treatment. A heating condition is appropriately adjustable depending on a volatilization temperature of the solvent and a solid content concentration of the filler 15.

FIG. 5F illustrates a step of forming mold materials 19 to form the pressure chambers 12 communicating with the ejection ports 11 and the ejection port forming member 9 including the ejection ports 11 on the first surface 21 of the substrate 10. As the mold materials 19, for example, a positive photosensitive resin is usable. As the method of forming the pressure chambers 12 communicating with the ejection ports 11, a common photolithography technique is usable. The ejection ports 11 are formed using the ejection port forming member 9. As the ejection port forming member 9, for example, a negative photosensitive epoxy resin is usable. The ejection port forming member 9 is a member also functioning as ceilings and side walls of the pressure chambers 12 through which the first liquid flow paths 51 communicate with the ejection ports 11. The ejection port forming member 9 is a member forming a part of the pressure chambers 12 communicating with the ejection ports 11 and coming into contact with liquid. Therefore, the ejection port forming member 9 needs to have high mechanical strength as a structure material, and needs to have adhesiveness with the substrate 10 as a base and liquid resistance (e.g., ink resistance). Furthermore, the ejection port forming member 9 is required to have resolution to pattern minute patterns for the ejection ports 11.

As a method of forming the ejection ports 11, a common photolithography technique is usable.

FIG. 5G illustrates a step of removing the aqueous filler 15 and the mold materials 19. As a material to remove the filler 15, for example, pure water is usable; however, a different removing material can be used depending on the type of the filler. As a material to remove the mold materials 19, for example, methyl lactate is usable. Thereafter, heating treatment is performed to complete the recording element substrate.

As described above, in the manufacturing process of the recording element substrate, even in a case where the liquid ejection port is formed perpendicularly to the substrate, the filler 15 can be applied without trapping bubbles, which makes it possible to manufacture the recording element substrate with high manufacturing accuracy.

Figure 6:
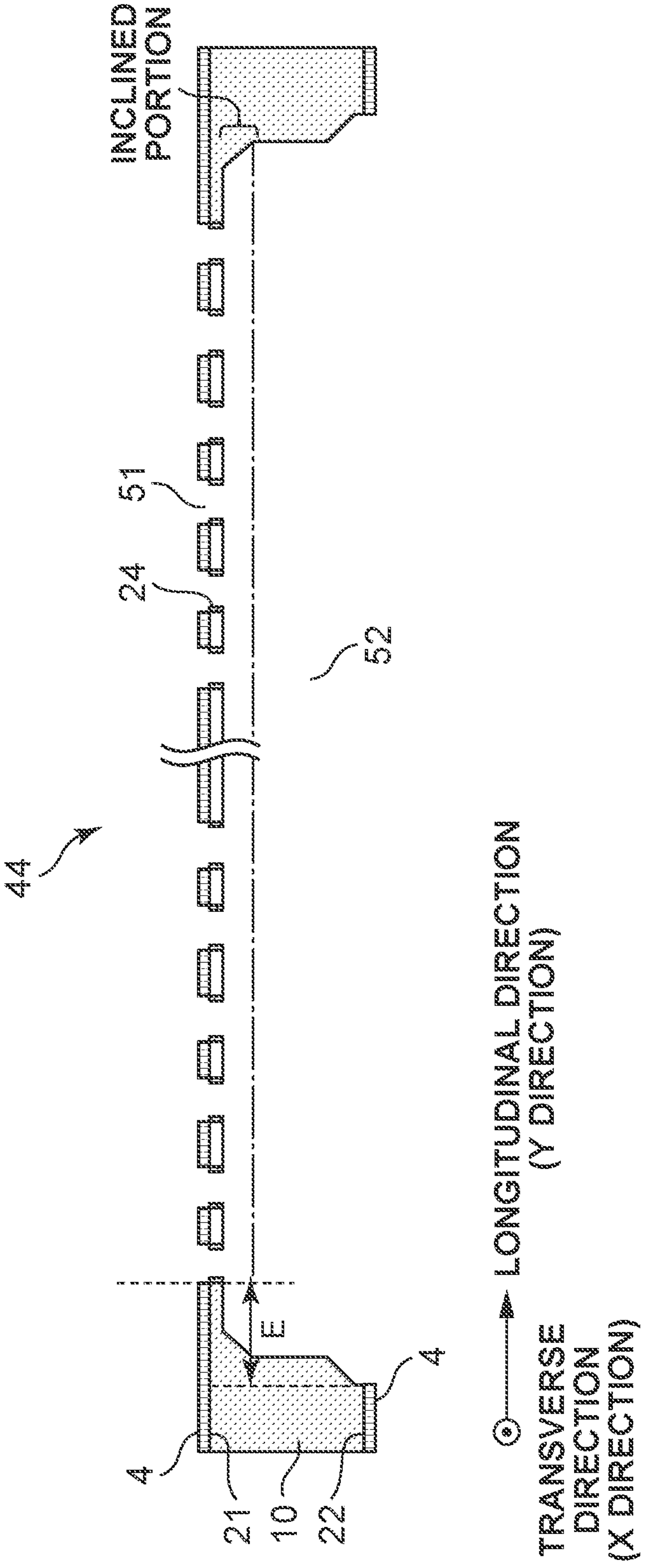
FIG. 6 is a cross-sectional view illustrating a longitudinal direction of a recording element substrate according to a first exemplary embodiment.

FIG. 6 is a cross-sectional view of the recording element substrate according to the present exemplary embodiment taken along opening centers of the first liquid flow paths 51 in the longitudinal direction of the recording element substrate, as viewed from a direction in which the inclined surface 23 of the second liquid flow path 52 is viewable. The plurality of first liquid flow paths 51 is formed from the first surface 21 side relative to the second liquid flow path 52. An end part shape of the second liquid flow path 52 in the longitudinal direction includes a plurality of crystal planes as illustrated in FIG. 6. The shape can be changed depending on the positions where the guide holes 31 are formed and the time of the anisotropic etching.

In the present exemplary embodiment, the method of manufacturing the substrate 10 provided with the liquid supply port 13 including the first portions 61 and the second portion 62 is described; however, it is sufficient to prepare such a substrate 10.

As the above-described liquid supply port 13, the example in which a center axis of each of the first portions 61 and a center axis of the second portion 62 are shifted from each other is described; however, the center axis of each of the first portions 61 and the center axis of the second portion 62 need not be shifted from each other. In the case where the center axis of each of the first portions 61 and the center axis of the second portion 62 are shifted from each other, the filler 15 can easily flow along the inclined surface when the filler 15 is applied. This causes the filler 15 to flow from each of the inner walls 61*a* connected to the inclined surface 23, and the possibility that bubbles are trapped with the filler 15 can be expected to be further reduced. The center axis of each of the first portions 61 is a center axis passing through a center of each of the first portions 61 and extending in a direction from the second surface 22 toward the first surface 21. Likewise, the center axis of the second portion 62 is a center axis passing through a center of the second portion and extending in the direction from the second surface 22 toward the first surface 21.

Further, a distance between the center axis of each of the first portions 61 and the center axis of the second portion 62 in the transverse direction is denoted by D. At this time, the distance D is desirably set as large as possible within a range where an opening end of each of the first liquid flow paths 51 does not exceed an opening end of the second liquid flow path 52, in consideration of opening dimensions of both of the first liquid flow paths 51 and the second liquid flow path 52.

Further, in FIG. 4D, an angle formed by the inner wall of each of the first portions 61 and the inclined surface 23 of the inner wall of the second portion 62 is denoted by α. At this time, when the angle α is excessively small, an inclination angle becomes small, and the filler 15 does not flow along the inclined surface 23. When the angle α is excessively large, the inclination angle becomes excessively large, and air is trapped with the filler 15 at the time of being applied into the first liquid flow paths 51. Therefore, the angle α is desirably about 110 degrees to about 160 degrees.

Further, the hydrophilic film according to the present exemplary embodiment indicates a hydrophilic film having a contact angle of 70 degrees or less. Further, to cause the filler 15 to easily flow, the contact angle of the hydrophilic film is desirably 40 degrees or less that is commonly regarded to be hydrophilic. The contact angle according to the present exemplary embodiment indicates a dynamic receding contact angle of pure water on a member surface. Typically, the dynamic receding contact angle can be measured by an extension contraction method in which a liquid droplet is dropped onto the member surface, and then the behavior of the liquid droplet is measured when a liquid is injected and absorbed.

In the present exemplary embodiment, the liquid-flow-path wall-surface protection film 18 is formed on the wall surface of the second liquid flow path 52 in FIG. 4C, and the hydrophilic films 24 are formed only on the first portions 61 in FIG. 4E; however, the hydrophilic film may be formed on the inclined surface 23 of the inner wall of the second portion 62. In this case, the step of forming the liquid-flow-path wall-surface protection film 18 on the wall surface of the second liquid flow path 52 may not be performed.

Further, in addition to formation of the hydrophilic films 24 on the inner walls of the first portions 61, a water-repellent film may be formed on the inclined surface 23 of the inner wall of the second portion 62. At this time, in the step of forming the hydrophilic films 24 on the inner walls of the first portions 61, it is necessary to form the liquid-flow-path wall-surface protection film 18 on the inclined surface 23 of the inner wall of the second portion 62, and in the step of forming the water-repellent film on the inclined surface 23 of the inner wall of the second portion 62, it is necessary to form the liquid-flow-path wall-surface protection films 18 on the inner walls of the first portions 61. As a result, it is possible to form the desired films on both of the wall surfaces. The formation of the hydrophilic films and the formation of the water-repellent film may be performed in any order. However, the hydrophilic films 24 are desirably formed on the inner walls of the first portions 61 after the water-repellent film is formed on the inclined surface 23 of the inner wall of the second portion 62 because the formation of the hydrophilic films 24 formed on the inner walls of the first portions 61 further contributes to the filling rate of the filler 15.

In the formation of the water-repellent film, the liquid-flow-path wall-surface protection film 18 desirably has a film thickness of, for example, about 2 μm to 10 μm as in the formation of the hydrophilic films, but may have any thickness as long as it is durable as the mask in the formation of the water-repellent film.

The water repellency as used herein means that, when a water droplet is in contact with a member, the water droplet does not cause the member to get wet and does not spread over the member, and it is determined whether the water-repellent film has been formed on the member, by measuring the contact angle of a surface of the member. The water-repellent film according to the present exemplary embodiment indicates the water-repellent film having the contact angle of 110 degrees or more.

Modified Example

A modified example of the first exemplary embodiment of the present disclosure is described. In the following description, portions different from the first exemplary embodiment are mainly described, and descriptions of portions similar to the first exemplary embodiment are omitted.

A method of manufacturing a recording element substrate according to the modified example is different from the method of manufacturing the recording element substrate according to the first exemplary embodiment in that a resin dissolved in an oil solvent, i.e., an oil filler is used. As the oil filler, an oil filler that is removable in a subsequent step is usable. Further, different filler removing materials can be used depending on the type of the filler.

In the modified example, the water-repellent films are formed at least on the inner walls of the first portions 61. As a result, in a case where the oil filler is used, the oil filler easily flows along the inner walls of the first portions 61 more preferentially. In other words, it is possible to prevent bubbles from entering the space between each of the inner walls of the first portions 61 and the filler, and to prevent bubbles being trapped with the filler. The contact angle of the water-repellent film according to each exemplary embodiment is 110 degrees or more; however, the contact angle of each of the inner walls of the first portions 61 in this modified example is desirably 150 degrees or more in order to cause the oil filler to easily flow along the first portions 61.

Further, in the modified example, the water-repellent films are formed on the first portions 61; however, the water-repellent film may be formed on the inclined surface 23 of the inner wall of the second portion 62. In this case, the step of forming the liquid-flow-path wall-surface protection film 18 on the wall surface of the second liquid flow path 52 may not be performed.

In a case where the water-repellent films are formed only on the wall surfaces of the first portions 61, the filler 15 flows into the first portions 61 without remaining on the inclined surface 23 as compared with a case where a water-repellent film is also formed on the inclined surface 23 of the inner wall of the second portion 62. In other words, the filling rate of the filler 15 is improved, and the filling is performable with the smaller amount of filler, which leads to cost reduction.

Further, in addition to formation of the water-repellent films on the inner walls of the first portions 61, the hydrophilic film may be formed on the inclined surface 23 of the inner wall of the second portion 62. In this case, in the step of forming the water-repellent films on the inner walls of the first portions 61, it is necessary to form the liquid-flow-path wall-surface protection film 18 on the inclined surface 23 of the inner wall of the second portion 62, and in the step of forming the hydrophilic film on the inclined surface 23 of the inner wall of the second portion 62, it is necessary to form the liquid-flow-path wall-surface protection films 18 on the inner walls of the first portions 61. As a result, it is possible to form the desired films on both of the wall surfaces. The formation of the water-repellent films and the formation of the hydrophilic film may be performed in any order. However, the water-repellent films are desirably formed on the inner walls of the first portions 61 after the hydrophilic film is formed on the second portion 62 because the formation of the water-repellent films formed on the inner walls of the first portions 61 further contributes to the filling rate of the filler 15.

A configuration of a recording element substrate according to a second exemplary embodiment of the present disclosure is described. In the following description, portions different from the first exemplary embodiment are mainly described, and descriptions of portions similar to the first exemplary embodiment are omitted.

Figure 7:
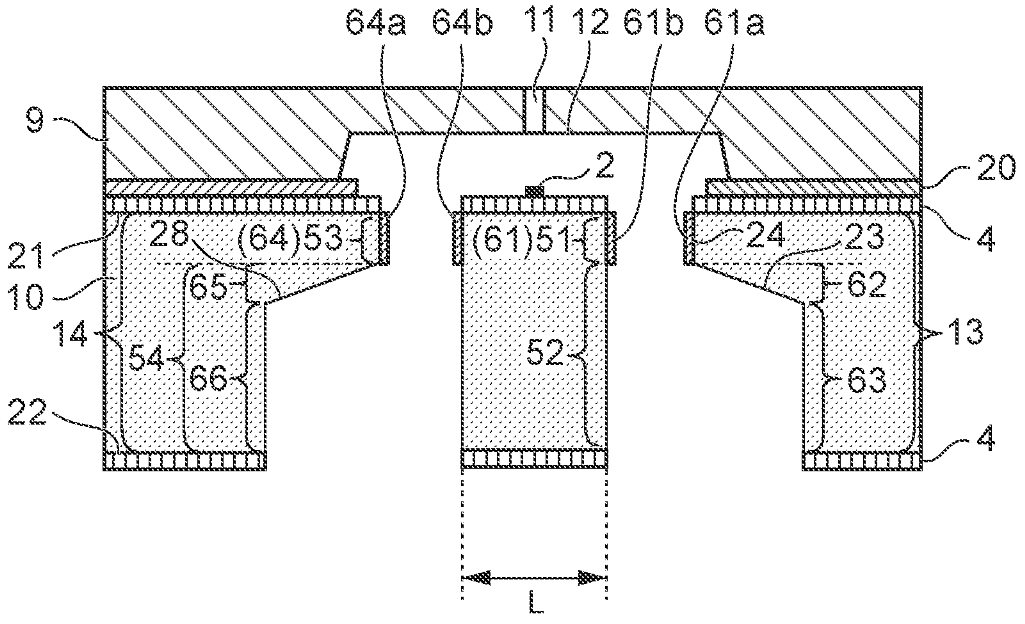
FIG. 7 is a cross-sectional view of a recording element substrate according to a second exemplary embodiment.

FIG. 7 is a cross-sectional view of the recording element substrate according to the second exemplary embodiment. The recording element substrate according to the second exemplary embodiment is a recording element substrate used for a circulation-type liquid ejection head, and is different from the recording element substrate according to the first exemplary embodiment in that a liquid collection port 14 corresponding to the liquid supply port 13 is provided in the longitudinal direction of the substrate 10. The liquid collection port 14 includes third liquid flow paths 53 perpendicularly connected to the first surface 21, and a fourth liquid flow path 54 connected to the second surface 22. It is sufficient that the third liquid flow paths 53 are substantially perpendicularly connected to the first surface 21, and the third liquid flow paths 53 are each perpendicularly connected to the first surface 21 at an angle of 90±5 degrees.

The third liquid flow paths 53 correspond to the first liquid flow paths 51, and the fourth liquid flow path 54 corresponds to the second liquid flow path 52. Further, the third liquid flow paths 53 are also referred to as fourth portions 64. In the fourth liquid flow path 54, a portion where an inner wall is inclined is referred to as a fifth portion 65, and a portion where one end is connected to an inclined surface 28 of an inner wall of the fifth portion 65 and the other end is perpendicularly connected to the second surface 22 is referred to as a sixth portion 66. In other words, in FIG. 7, the liquid collection port 14 is configured by the fourth portions 64, the fifth portion 65, and the sixth portion 66. The inclined surface 28 of the inner wall of the fifth portion 65 is inclined toward inner walls of the fourth portions 64 such that a width in the transverse direction (X direction) is gradually increased toward the second surface 22.

In FIG. 7, the liquid collection port 14 including the sixth portion 66 is illustrated; however, the liquid collection port 14 according to the present exemplary embodiment needs not include the sixth portion 66. In other words, the liquid collection port 14 may be configured only by the fourth portions 64 and the fifth portion 65. That is, structures of the third liquid flow paths 53 and the fourth liquid flow path 54 are substantially the same as the structures of the first liquid flow paths 51 and the second liquid flow path 52 according to the first exemplary embodiment. Further, a method of forming the third liquid flow paths 53 and the fourth liquid flow path 54 is also substantially the same as the method of forming the first liquid flow paths 51 and the second liquid flow path 52 according to the first exemplary embodiment. Therefore, description of the method is omitted.

In the second exemplary embodiment, the liquid circulates through the second liquid flow path 52, the first liquid flow paths 51, the pressure chambers 12, the third liquid flow paths 53, and the fourth liquid flow path 54 in this order.

In the manufacture of the circulation-type recording element substrate, the inclined surface 23 and the inclined surface 28 cause the filler to flow downward from one side (inclined surface 23 and inclined surface 28) instead of flowing downward (toward first portions 61 or fourth portions 64) over the entire width of the liquid supply port as in the conventional example. Thus, as in the first exemplary embodiment, the filler 15 flows from the inner walls 61*a* connected to the inclined surface 23 toward the inner walls 61*b* and from inner walls 64*a* connected to the inclined surface 28 toward inner walls 64*b*, thereby being applied without trapping bubbles.

In the case of using the aqueous filler 15, the filler 15 easily flows along the inner walls of the first portions 61 and the inner walls of the fourth portions 64 more preferentially because the hydrophilic films are formed on the inner walls of the first portions 61 and the inner walls of the fourth portions 64. This makes it possible to prevent bubbles from entering spaces between the filler and both of the inner walls of the first portions 61 and the inner walls of the fourth portions 64, and to further prevent bubbles from being trapped with the filler 15*s*. Further, since the filler 15 can be applied without trapping bubbles, it is possible to form the ejection port forming member in the subsequent step without deteriorating flatness.

In the case of using the aqueous filler as in the first exemplary embodiment, the hydrophilic films or the water-repellent films may be formed on the inclined surface 23 of the inner wall of the second portion 62 and the inclined surface 28 of the inner wall of the fifth portion 65, in addition to the inner walls of the first portions 61 and the fourth portions 64.

Further, in the case of using the oil filler as in the modified example of the first exemplary embodiment, the water-repellent films are formed on the inner walls of the first portions 61 and the fourth portions 64. At this time, in addition to the first portions 61 and the fourth portions 64, the water-repellent films or the hydrophilic films may be formed on the inclined surface 23 of the inner wall of the second portion 62 and the inclined surface 28 of the inner wall of the fifth portion 65.

Further, the recording element substrate used for the circulation-type liquid ejection head includes a large number of liquid flow paths. Thus, there is a possibility that bubbles are trapped in the liquid flow paths, which largely influences on flatness of the substrate surface. Therefore, the configuration according to the present exemplary embodiment is suitable for that of the recording element substrate used for the circulation-type liquid ejection head.

To reduce a distance between the first liquid flow paths 51 and the third liquid flow paths 53, the first liquid flow paths 51 and the third liquid flow paths 53 are desirably arranged to have relationship of mirror inversion (right/left inversion) as illustrated in FIG. 7. When a distance between the second liquid flow path and the fourth liquid flow path in the transverse direction is denoted by L, it is desirable that the distance L between the second liquid flow path and the fourth liquid flow path is appropriately set in consideration of the distance between the first liquid flow paths 51 and the third liquid flow paths 53 and Si strength.

Further, in the present exemplary embodiment, it is sufficient to prepare the substrate 10 provided with the liquid collection port 14 including the fourth portions 64 and the fifth portion 65, as in the first exemplary embodiment.

The present disclosure is not limited to the above-described exemplary embodiments. The present disclosure can be variously changed and modified without departing from the ideas and the scope of the present disclosure. Examples according to the present disclosure are described below based on the above-described exemplary embodiments.

Example 1

A first example is described below. In a case where a formation process and a structure are similar to the formation process and the structure according to any of the above-described exemplary embodiments, descriptions thereof with reference to the drawings are omitted.

Figure 8A:
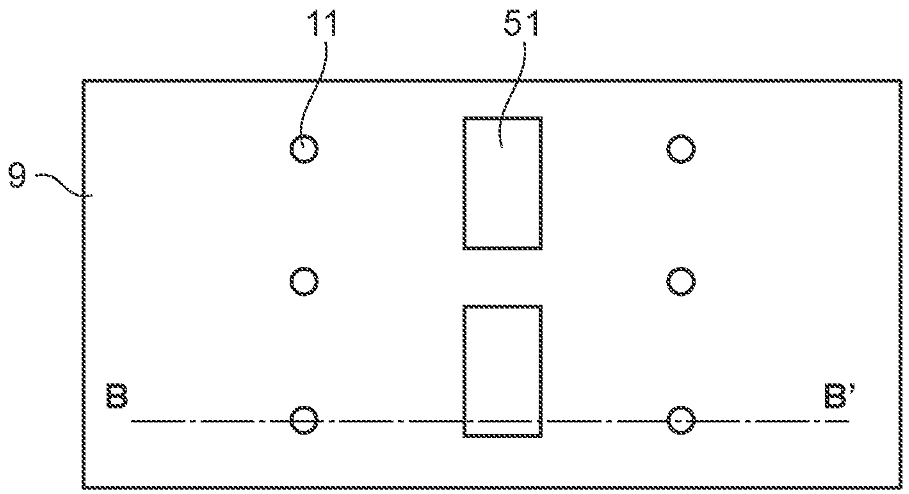
FIG. 8A is a top view of a recording element substrate according to a first example.
Figure 8B:
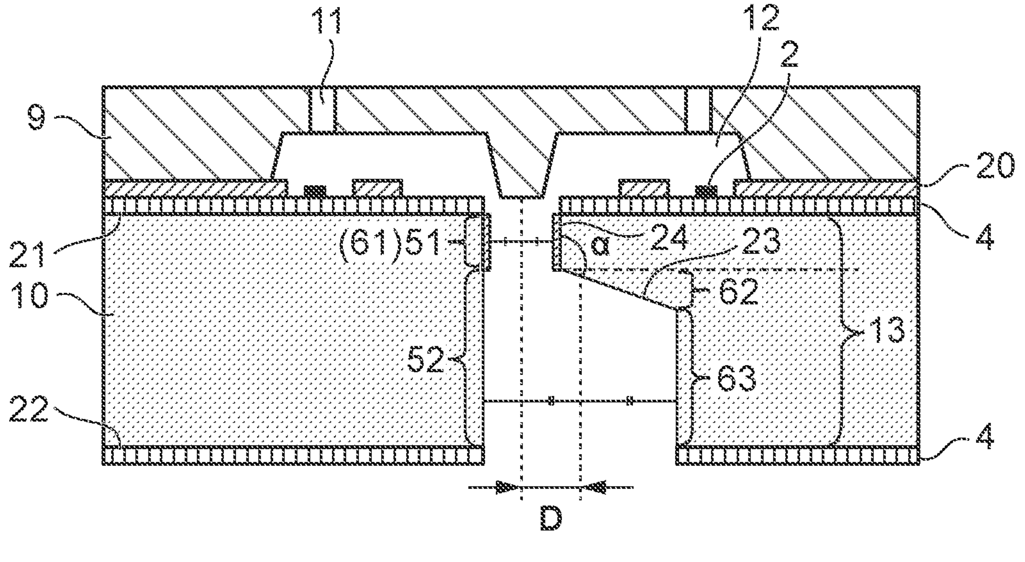
FIG. 8B is a cross-sectional view of the recording element substrate according to the first example.

FIGS. 8A and 8B are respectively a top view and a cross-sectional view of a recording element substrate in the first example. In the first example, the recording element substrate is in a completed state, i.e., in the state illustrated in FIG. 2B according to the first exemplary embodiment. The thickness of the substrate 10 is 725 μm.

FIG. 8A is a top view of the recording element substrate as viewed from the first surface 21 side. As a configuration, the first liquid flow paths 51 are formed in one line along the longitudinal direction of the recording element substrate, and the ejection ports 11 are formed in one line along the longitudinal direction of the recording element substrate on each of right and left sides of the first liquid flow paths 51. In the first example, an opening shape of each of the first liquid flow paths 51 is a square shape, and an opening dimension is 100 μm. Further, an interval between ends of the adjacent first liquid flow paths 51 is 50 μm. In the transverse direction, a distance from an opening center of each of the first liquid flow paths 51 to an opening center of each of the ejection ports 11 is 130 μm. An opening shape and an opening dimension of each of the ejection ports 11 are a true circular shape and 8 μm in diameter. In the longitudinal direction, an interval between any adjacent two of the ejection ports 11 is 40 μm. The right and left ejection port lines re not necessarily symmetrical about the first liquid flow paths 51, and may be arranged on the right and left sides in accordance with a different positional relationship in consideration of the ejection port size, ejection characteristics, and the like.

FIG. 8B is a cross-sectional view taken along line B-B' illustrated in FIG. 8A. The opening dimension of the second liquid flow path 52 in the transverse direction is 400 μm, and the opening direction in the longitudinal direction is 20000 μm.

As for the position of the inclined surface 23 of the inner wall of the second portion 62, an apex of inclination of the inclined surface 23 on a side close to the first surface 21 is formed at a position of 50 μm from the first surface 21 in a depth direction of the substrate. The angle formed by the inner wall of each of the first portions 61 and the inclined surface 23 of the inner wall of the second portion 62 is 125.3 degrees.

The distance D between the opening center of the second liquid flow path 52 and the opening center of each of the first liquid flow paths 51 in the transverse direction is 150 μm.

Example 2

A second example is described below. In the case where a formation process and a structure are similar to the formation process and the structure according to any of the above-described exemplary embodiments, descriptions thereof with reference to the drawings are omitted. Further, in a case where specific dimensions, positional relationship, and the like are similar to the specific dimensions, the positional relationship, and the like according to the first example, descriptions thereof are omitted.

Figure 9A:
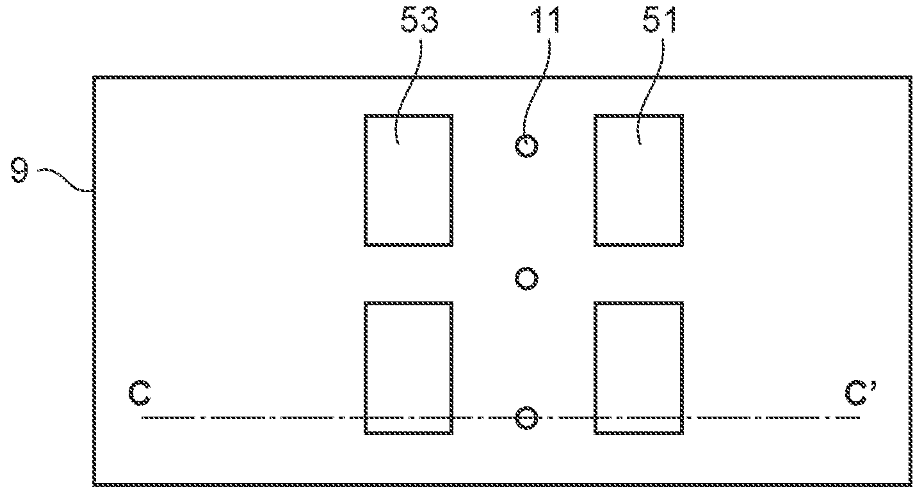
FIG. 9A is a top view of a recording element substrate according to a second example.
Figure 9B:
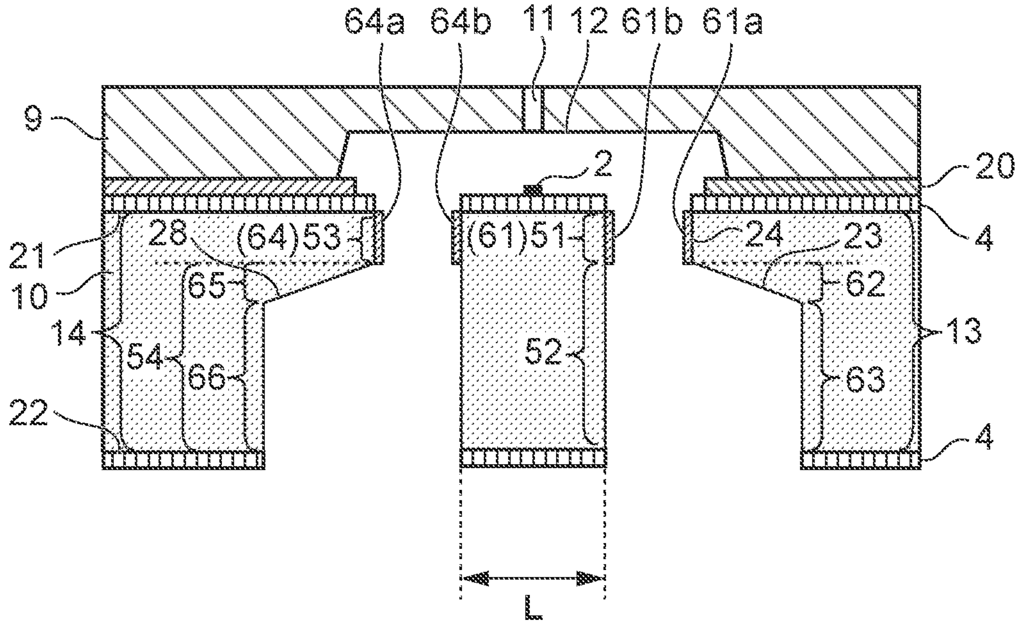
FIG. 9B is a cross-sectional view of the recording element substrate according to the second example.
Figure 10:
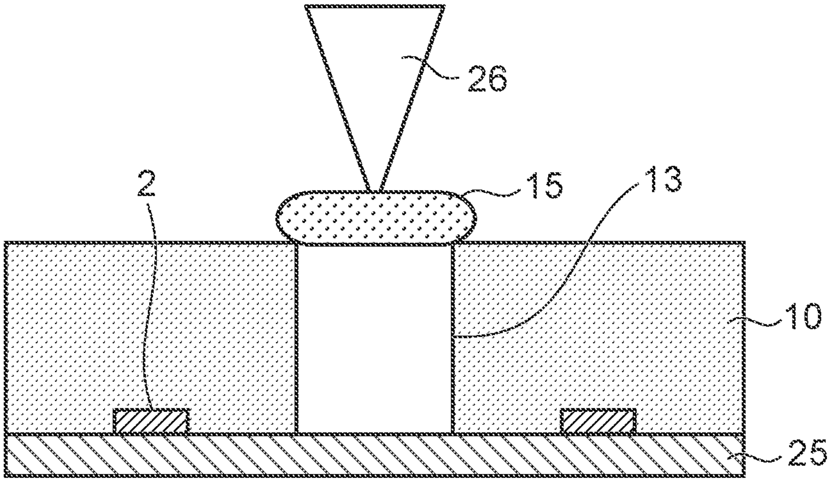
FIG. 10 PRIOR ART
FIG. 10 is a schematic view illustrating a state where a filler is applied according to a conventional example.
Figure 11A:
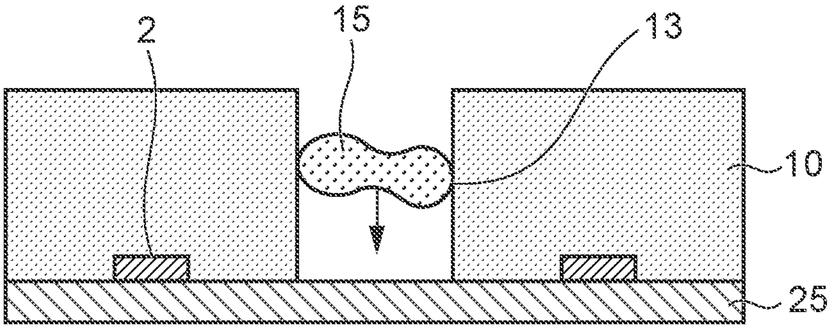
FIG. 11A PRIOR ART
FIG. 11A is a schematic view illustrating the state where a filler is applied according to the conventional example.
Figure 11B:
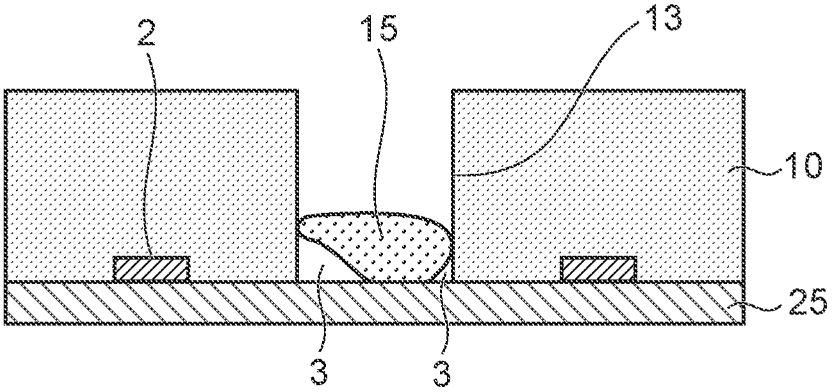
FIG. 11B PRIOR ART
FIG. 11B is a schematic view illustrating a state where bubbles are trapped with the filler according to the conventional example.

FIGS. 9A and 9B each illustrate the state where the recording element substrate according to the second exemplary embodiment is completed, i.e., the state illustrated in FIG. 2B according to the second exemplary embodiment. FIG. 9A is a top view of the recording element substrate as viewed from the first surface 21 side. As a configuration, the first liquid flow paths 51 are formed in one line and the third liquid flow paths 53 are formed in one line, along the longitudinal direction of the recording element substrate, and the ejection ports 11 are formed in one line along the longitudinal direction between the line of the first liquid flow paths 51 and the line of the third liquid flow paths 53. It is desirable that, in the transverse direction, a distance between opening centers of the first liquid flow paths 51 arranged on a right side and opening centers of the third liquid flow paths 53 arranged on a left side is appropriately set in consideration of the ejection port size, the ejection characteristics, and the like. In the second example, the distance between the first liquid flow paths 51 and the third liquid flow paths 53 in the transverse direction is 300 μm. The ejection ports 11 are arranged at an intermediate position bisecting the distance between the first liquid flow paths 51 on the right side and the third liquid flow paths 53 on the left side. The shapes and the dimensions of the first liquid flow paths 51 on the right side may be different from the shapes and the dimensions of the third liquid flow paths 53 on the left side. The ejection ports 11 formed between the first liquid flow paths 51 and the third liquid flow paths 53 are not necessarily arranged at the intermediate position bisecting the distance between the flow paths on the right side and the flow paths on the left side, and the positions of the ejection ports 11 are appropriately adjustable based on the ejection characteristics and the like.

FIG. 9B is a cross-sectional view taken along line C-C' illustrated in FIG. 9A. Since the first liquid flow paths 51 are formed in one line on the right side and the third liquid flow paths 53 are formed in one line on the left side, along the longitudinal direction, the second liquid flow path 52 and the fourth liquid flow path 54 corresponding thereto are formed. The dimension of the second liquid flow path 52 and the distance D distance D between the opening center of the second liquid flow path 52 and the opening center of each of the first liquid flow paths 51 are equivalent to those described in the first example. Further, the dimensions of the third liquid flow paths 53 are equivalent to the dimensions of the first liquid flow paths 51 in the first example, and the dimension of the fourth liquid flow path 54 is equivalent to the dimension of the second liquid flow path 52 in the first example. The inclination of the inner wall of the second portion 62 on the right side and the inclination of the inner wall of the fifth portion 65 on the left side are arranged to have relationship of mirror inversion (right/left inversion). Further, in the second example, a distance L between the second liquid flow path 52 and the fourth liquid flow path 54 is 200 μm.

According to the exemplary embodiments of the present disclosure, it is possible to provide a recording element substrate that can prevent bubbles from getting trapped with a filler when a liquid supply port provided perpendicularly to the substrate is filled with the filler, and a method of manufacturing the recording element substrate.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-009843, filed Jan. 26, 2022, which is hereby incorporated by reference herein in its entirety.

What is claimed is:

1. A recording element substrate comprising:

an ejection port forming member in which an ejection port configured to eject liquid is formed; and a substrate including a liquid supply port configured to supply the liquid to the ejection port, a first surface on which the ejection port forming member is placed, and a second surface that is a rear surface of the first surface, wherein the liquid supply port includes a first portion perpendicularly connected to the first surface, a second portion connected to the first portion, and a third portion perpendicularly connected to the second portion, wherein an inner wall of the second portion includes an inclined surface that is inclined toward an inner wall of the first portion such that a width of the second portion is gradually increased toward the second surface, and wherein a hydrophilic film is formed at least on the inner wall of the first portion.

2. The recording element substrate according to claim 1, wherein a hydrophilic film is formed on the inclined surface of the inner wall of the second portion.

3. The recording element substrate according to claim 1, wherein a water-repellent film is formed on the inclined surface of the inner wall of the second portion.

4. The recording element substrate according to claim 1, wherein a contact angle of the hydrophilic film formed on the inner wall of the first portion is 40 degrees or less.

5. The recording element substrate according to claim 1, wherein an angle formed by the inner wall of the first portion and the inclined surface of the inner wall of the second portion is 110 degrees to 160 degrees.

6. The recording element substrate according to claim 1, wherein a center axis of the first portion and a center axis of the second portion are shifted from each other.

7. The recording element substrate according to claim 1, further comprising a liquid collection port configured to collect the liquid from the ejection port, wherein the liquid collection port includes a fourth portion perpendicularly connected to the first surface, a fifth portion connected to the fourth portion, and a sixth portion connected to the fifth portion, wherein an inner wall of the fifth portion includes an inclined surface that is inclined toward an inner wall of the fourth portion such that a width of the fifth portion is gradually increased toward the second surface, wherein one end of the sixth portion is connected to the inclined surface of the inner wall of the fifth portion, and the other end of the sixth portion is perpendicularly connected to the second surface, and wherein a hydrophilic film is formed at least on the inner wall of the fourth portion.

8. The recording element substrate according to claim 7, wherein a hydrophilic film is further formed on the inclined surface of the inner wall of the fifth portion.

9. The recording element substrate according to claim 7, wherein a water-repellent film is further formed on the inclined surface of the inner wall of the fifth portion.

10. The recording element substrate according to claim 7, wherein a center axis of the fourth portion and a center axis of the fifth portion are shifted from each other.

11. A recording element substrate, comprising:

an ejection port forming member in which an ejection port configured to eject liquid is formed; and a substrate including a liquid supply port configured to supply the liquid to the ejection port, a first surface on which the ejection port forming member is placed, and a second surface that is a rear surface of the first surface, wherein the liquid supply port includes a first portion perpendicularly connected to the first surface, a second portion connected to the first portion, and a third portion perpendicularly connected to the second portion, wherein an inner wall of the second portion includes an inclined surface that is inclined toward an inner wall of the first portion such that a width of the second portion is gradually increased toward the second surface, and wherein a water-repellent film is formed at least on the inner wall of the first portion.

12. The recording element substrate according to claim 11, wherein a water-repellent film is formed on the inclined surface of the inner wall of the second portion.

13. The recording element substrate according to claim 11, wherein a hydrophilic film is formed on the inclined surface of the inner wall of the second portion.

14. The recording element substrate according to claim 11, wherein a contact angle of the water-repellent film formed on the inner wall of the first portion is 150 degrees or more.

15. The recording element substrate according to claim 11, further comprising a liquid collection port configured to collect the liquid from the ejection port, wherein the liquid collection port includes a fourth portion perpendicularly connected to the first surface, a fifth portion connected to the fourth portion, and a sixth portion connected to the fifth portion, wherein an inner wall of the fifth portion includes an inclined surface that is inclined toward an inner wall of the fourth portion such that a width of the fifth portion is gradually increased toward the second surface, wherein one end of the sixth portion is connected to the inclined surface of the inner wall of the fifth portion, and the other end of the sixth portion is perpendicularly connected to the second surface, and wherein a water-repellent film is formed at least on the inner wall of the fourth portion.

16. The recording element substrate according to claim 15, wherein a water-repellent film is further formed on the inclined surface of the inner wall of the fifth portion.

17. A method of manufacturing a recording element substrate, wherein the recording element substrate includes an ejection port forming member in which an ejection port configured to eject liquid is formed, and a substrate including a liquid supply port configured to supply the liquid to the ejection port, a first surface on which the ejection port forming member is placed, and a second surface that is a rear surface of the first surface, the method comprising:

preparing the substrate such that the liquid supply port includes a first portion perpendicularly connected to the first surface, a second portion connected to the first portion, a third portion perpendicularly connected to the second portion, and an inner wall of the second portion includes an inclined surface that is inclined toward an inner wall of the first portion such that a width of the second portion is gradually increased toward the second surface;

forming a hydrophilic film at least on the inner wall of the first portion;

attaching a tape on the first surface of the substrate including the liquid supply port;

filling the first portion with an aqueous filler by dropping the aqueous filler on the inclined surface of the inner wall of the second portion;

removing the tape;

forming the ejection port forming member on the first surface; and removing the aqueous filler.

18. The method of manufacturing the recording element substrate according to claim 17, wherein, in forming the hydrophilic film, a hydrophilic film is further formed on the inclined surface of the inner wall of the second portion.

19. The method of manufacturing the recording element substrate according to claim 17, further comprising forming a water-repellent film on the inclined surface of the inner wall of the second portion.

20. The recording element substrate according to claim 1, wherein the liquid supply port includes an opposing portion opposite the first portion, the second portion, and third portion, and wherein the opposing portion is perpendicularly connected to the first surface.

21. The recording element substrate according to claim 1, wherein the third portion is free from the hydrophilic film.

22. The recording element substrate according to claim 11, wherein the liquid supply port includes an opposing portion opposite the first portion, the second portion, and third portion, and wherein the opposing portion is perpendicularly connected to the first surface.

23. The recording element substrate according to claim 11, wherein the third portion is free from the hydrophilic film.

24. The method of manufacturing the recording element substrate according to claim 17, wherein the liquid supply port includes an opposing portion opposite the first portion, the second portion, and third portion, and wherein the opposing portion is perpendicularly connected to the first surface.

25. The method of manufacturing the recording element substrate according to claim 17, wherein the third portion is free from the hydrophilic film.

* * * * *